(12) United States Patent
Gisquet et al.

(10) Patent No.: US 8,650,469 B2
(45) Date of Patent: Feb. 11, 2014

(54) METHOD AND DEVICE FOR PROCESSING A DATA STREAM

(75) Inventors: Christophe Gisquet, Rennes (FR);
Hervé Le Floch, Rennes (FR)

(73) Assignee: Canon Kabushiki Kaisha, Tokyo (JP)

(*) Notice: Subject to any disclaimer, the term of this patent is extended or adjusted under 35 U.S.C. 154(b) by 745 days.

(21) Appl. No.: 12/417,359

(22) Filed: Apr. 2, 2009

(65) Prior Publication Data

US 2009/0254798 A1    Oct. 8, 2009

(30) Foreign Application Priority Data

Apr. 4, 2008    (FR) ..................................... 08 52260

(51) Int. Cl.
*G06F 11/00*    (2006.01)
(52) U.S. Cl.
USPC ........................... 714/799; 714/759; 714/760
(58) Field of Classification Search
USPC .................................................. 714/799, 759
See application file for complete search history.

(56) References Cited

U.S. PATENT DOCUMENTS

| 5,778,191 | A | 7/1998 | Levine et al. ............. 395/200.77 |
| 7,058,200 | B2 | 6/2006 | Donescu et al. ................ 382/100 |
| 7,478,241 | B2 | 1/2009 | Le Floch ....................... 713/176 |
| 7,567,716 | B2 | 7/2009 | Henry et al. .................. 382/232 |
| 7,861,131 | B1 * | 12/2010 | Xu et al. ....................... 714/752 |
| 2004/0039985 | A1 * | 2/2004 | Mikkola et al. ............... 714/776 |
| 2006/0050789 | A1 | 3/2006 | Gisquet et al. ........... 375/240.23 |
| 2006/0168504 | A1 * | 7/2006 | Meyer et al. .................. 714/799 |
| 2007/0195880 | A1 | 8/2007 | Henocq et al. ........... 375/240.13 |
| 2008/0005642 | A1 * | 1/2008 | Kikuchi et al. ............... 714/758 |
| 2008/0130739 | A1 | 6/2008 | Le Floch et al. ......... 375/240.01 |
| 2008/0144725 | A1 | 6/2008 | Henocq et al. ........... 375/240.27 |
| 2009/0034608 | A1 | 2/2009 | Gisquet .................... 375/240.01 |
| 2009/0041132 | A1 | 2/2009 | Le Floch et al. ......... 375/240.26 |

FOREIGN PATENT DOCUMENTS

WO    2007/084167 A    7/2007

* cited by examiner

*Primary Examiner* — Sarai Butler
(74) *Attorney, Agent, or Firm* — Fitzpatrick, Cella, Harper & Scinto

(57) ABSTRACT

A method of processing a stream of coded data before decoding comprises a step of detecting missing or erroneous data in the stream of coded data.
It comprises a step of generating a series of data ready for decoding formed from the stream of coded data, and a series of additional data supplying information representing the position of the missing or erroneous data detected.

10 Claims, 5 Drawing Sheets

METHOD AND DEVICE FOR PROCESSING A DATA STREAM

FIELD OF THE INVENTION

The present invention concerns a method and device for processing a data stream.

More particularly, it concerns the processing of a stream of coded data before decoding.

BACKGROUND OF THE INVENTION

When data is transmitted in a network, errors may arise.

By way of in no way limiting example, the data transmitted over a packet switched communication network is organized in packets of binary data and the errors to which these communications are generally subject are errors on the data constituting a network packet, as well as losses of complete network packets.

These errors on the data constituting a packet are missing or erroneous data in the network packet, for example an inversion of the value of one or more binary data items or the loss of one or more data items.

These errors are typically due to the nature of the transmission channel.

The loss of network packets is typically due to congestion on the network, as well as to the rejection of corrupted network packets, that is to say those comprising one or more errors and/or omissions.

The bit errors may be indicated by:

a lower network layer, or correcting codes that were incapable of correcting an error but were able at least to discern its position.

Thus, when a stream of coded data containing the payload of at least one network packet arrives at a decoder in order to be decoded, and this data stream includes an error, the decoder may suffer desynchronization when this error is read.

Some decoders, when they detect that an error has occurred, go into resynchronization mode, that is to say they seek a synchronization marker indicating the start of a data sequence or the start of a packet of coded data, for example video data.

Nevertheless, this error being detected a certain length of time after it occurred, the decoder continues to read the data of the data stream. This data is therefore not decoded correctly, given that the decoder is desynchronized after the reading of the error.

In addition, between the moment when the decoder reads the error (the moment when it desynchronizes) and the moment when the decoder knows that an error has occurred (the moment when it goes into resynchronization mode), the decoder, desynchronized, may interpret the start of a packet of coded data erroneously. Thus the following data in this packet of coded data is interpreted erroneously.

In both cases, data that was valid (that is to say that did not contain any erroneous data) is wrongly decoded.

Thus, in addition to the presence of errors in the data stream for the reasons disclosed above, these errors may propagate in the data stream, thus causing additional errors.

The ISO/IEC standard 14496-2 *"Information technology—coding of audio-visual objects—part 2: Visual"* describes the attribution of a predetermined value to a data item belonging to the data stream in order to indicate, within the data stream, the presence of an error.

This data item indicating the presence of an error consists of a bit situated at the start of the data stream corresponding to an image.

In the MPEG-4 standard, an image is called VOP (from the English "Video Object Plane"). More particularly, the bit is situated in an information unit called GOV or GOP (from the English "Group of Video Object Plane") situated before an image or VOP of the I-VOP type (from the English "Intra coded VOP". This type of VOP contains all the information necessary for being decoded by the decoder.

The images or VOP can also be of the P-VOP type (from the English "Predictive coded VOP"). This type of VOP requires a reference image for its decoding.

The images or VOP can also be of the B-VOP type (from the English "Bidirectionally-predictive coded VOP"), requiring two reference images, including at least one of the P-VOP type. In the context of the use of this bit, an image of the B-VOP type uses as references an image of the I-VOP type (the preceding one in the data stream) and an image of the P-VOP type (the following one in the data stream).

When the bit indicating the presence of an error has a value "1", the decoder is warned of the fact that the first B-VOP or the first sequence of consecutive B-VOPs situated after the I-VOP that is situated at the start of the data stream will not be correctly decoded, since the P-VOP that should follow the B-VOP or B-VOPs is not present in the data stream.

The decoder thus takes the decision not to display these B-VOPs or images.

Thus, by means of a bit situated at the start of the data stream, the decoder is warned of the existence of an error.

Nevertheless the possibility of warning the decoder of the presence of an error by means of this bit is limited to the type of error described above. The bit cannot be used to indicate other types of error.

Moreover, it is situated at a fixed position in the data stream, which does not make it possible to locate the errors.

The document U.S. Pat. No. 5,778,191 proposes to insert synchronization points in fixed positions of the bit stream produced by a coder, in order to improve the detection of errors and the resynchronization of a decoder.

This solution, in addition to not making it possible to locate the exact position of the errors, has an influence on the compression format, and this involves incompatibilities of the formats with certain standards.

SUMMARY OF THE INVENTION

The aim of the present invention is to remedy at least one of the aforementioned drawbacks by proposing a method of processing a data stream and a device associated with this method, making it possible in particular to know the exact position of an error present in a data stream.

For this purpose, the present invention proposes a method of processing a stream of coded data before decoding, comprising a step of detecting missing or erroneous data in the data stream.

According to the invention, the method comprises a step of generating a series of data ready for decoding formed from the stream of coded data, and a series of additional data supplying information representing the position of the missing or erroneous data detected.

Thus the presence of the erroneous data in the series of data ready for decoding is signaled to the decoder by means of the series of additional data.

In addition, the series of additional data signals the point where data is missing in the series of data ready for decoding.

Consequently the decoder knows the positions, in the series of data ready for decoding, of the erroneous or missing data detected.

Advantageously, the method also comprises a step of concatenating, with the series of data ready for decoding, a series of padding data so as to obtain a series of data of predetermined length.

Consequently the decoder, desynchronized because of the reading of the error, continues the decoding of the series of data ready for decoding by reading the padding data instead of reading the data that follows the error in the data stream. Thus incorrectly decoding the data that follows the error in the data stream is avoided.

According to a preferred characteristic, the method comprises:
- a step of decoding part of the series of data ready for decoding having the aforementioned predetermined length;
- a step of comparing the position of the last decoded data item of the part of the series of data ready for decoding, at a position of the erroneous or missing data in the series of additional data.

Thus, once the decoder has finished the decoding of part of the series of data ready for decoding, it checks whether this part of the series of data ready for decoding includes errors, that is to say missing or erroneous data.

Advantageously, the data in the series of data ready for decoding, situated between the position of the last decoded data item and the position of the data representing the start of a packet of coded data, is not decoded, when at the comparison step the position of the last decoded data item is higher than the position of the erroneous or missing data.

When the position of the last decoded data item is higher than the position of the erroneous or missing data, the decoded part of the series of data ready for decoding contains missing or erroneous data.

Thus the decoder does not read the data that follows the part of the series ready for decoding that has been decoded, and goes into synchronization data read mode, that is to say the decoder seeks to resynchronize itself.

Moreover, a second part of the series of data ready for decoding is decoded when, at the comparison step, the position of the last decoded data item is lower than the position of the erroneous or missing data.

This is because, when the position of the last decoded data item is lower than the position of the erroneous or missing data, the part of the series of data ready for decoding that has been decoded does not contain missing or erroneous data.

The decoder will thus continue the decoding of the series ready for decoding.

According to one embodiment, the information representing the position comprises the position of the data item situated in front of the missing or erroneous data in the part of the series of data ready for decoding.

Thus the position of the start of the missing or erroneous data is indicated to the decoder in a simple manner, since the position of the last data item present in the series of data ready for decoding is known to the de-encapsulator at all times.

For the same purpose as that indicated above, the present invention also proposes a device for processing a stream of coded data before decoding, comprising means of detecting missing or erroneous data in the stream of coded data.

According to the invention, the device comprises means of generating a series of data ready for decoding formed from the stream of coded data, and a series of additional data supplying information representing the position of the missing or erroneous data detected.

Advantageously, the device also comprises means of concatenating, with the series of data ready for decoding, a series of padding data so as to obtain a series of data of predetermined length.

According to a preferred characteristic, the device comprises:
- means of decoding part of the series of data ready for decoding having the aforementioned predetermined length;
- means of comparing the position of the last decoded data item in the part of the series of data ready for decoding, at a position of the erroneous or missing data in the series of additional data.

Still for the same purpose, the present invention also proposes a telecommunication system comprising a plurality of terminal devices connected through a telecommunication network, comprising at least one terminal device equipped with a device as succinctly described above.

Still for the same purpose, the present invention also proposes an information storage means able to be read by a computer or a microprocessor storing instructions of a computer program, remarkable that it is adapted to implement a method as succinctly described above when the stored information is read by the computer or the microprocessor.

In a particular embodiment, this storage means is partially or totally removable.

Still for the same purpose, the present invention also proposes a computer program product able to be loaded into a programmable apparatus, containing sequences of instructions for implementing a method as succinctly described above, when this computer program product is loaded into and executed by the programmable apparatus.

The advantages of the data processing device, as well as the particular characteristics and advantages of the telecommunication system, of the information storage means and of the computer program product, being similar to those of the data processing method, are not repeated here.

BRIEF DESCRIPTION OF THE DRAWINGS

Other aspects and advantages of the invention will emerge from a reading of the following detailed description of a particular embodiment and variants, given by way of non-limiting examples.

The description refers to the drawings that accompany it, in which.

DETAILED DESCRIPTION OF PARTICULAR EMBODIMENTS

By way of in no way limiting example, the processing of a data stream consisting of video data is described here.

This data is coded for example using the MPEG-4 standard, in particular Part 2 of MPEG-4. Naturally other standards can be used, such as for example H.263 or MPEG-2.

The standard corresponding to the MPEG-4 Part 2 video coding format is ISO 14496-2.

The encapsulation of the stream of coded video data in network packets according to this standard is described in RFC (from the English "Request for comments") 3016.

Each coded image to be transmitted through the communication network is generally divided into coded data packets. As indicated above, this image is called VOP in MPEG-4 language.

The context in which the invention is situated is first of all described with reference to FIG. 1.

The general context of the invention is the transmission of a stream of coded data over a communication network between a sender and at least one addressee.

Figure 1:
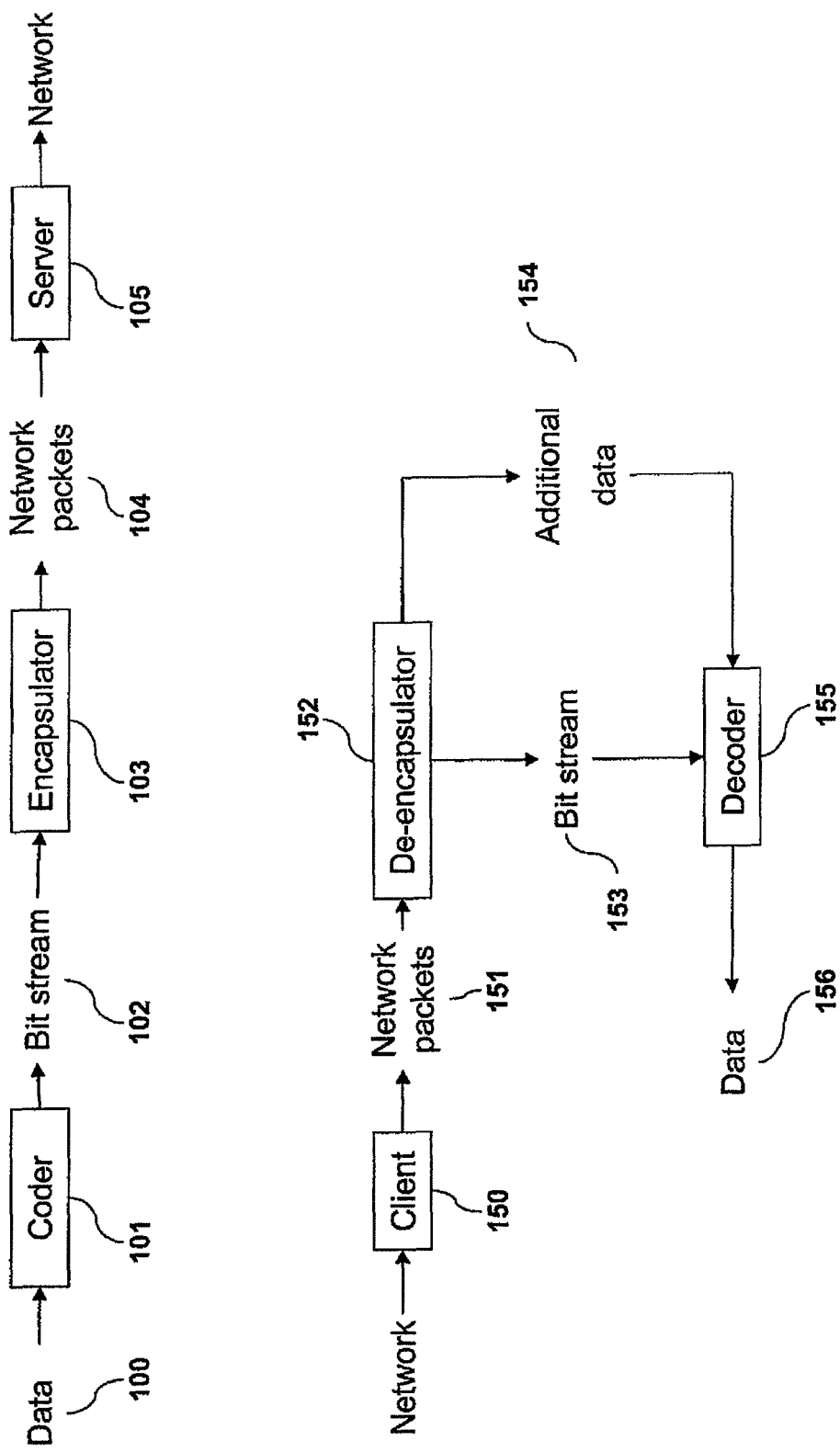
FIG. 1 depicts schematically the context of the present invention.

As shown by the top part of FIG. 1, data 100 to be transmitted over the communication network is coded by a coder 101 in order to form a stream of coded data 102.

In the particular embodiment described here, this stream of coded data 102 is a coded bit stream.

By way of non-limiting example, this coded bit stream 102 can represent multimedia data, that is to say video or audio data. In general, the bit stream is organized in a set of packets of coded data. Each packet of coded data comprises two parts, a header and a body (in English "body"), as explained below with reference to FIG. 5.

An encapsulator 103 forms network packets 104 from the bit stream 102, for example according to the rules contained in an RFC.

The encapsulation process is detailed for certain types of stream within the RFCs. For example, as mentioned above, RFC 3016 describes the encapsulation process for MPEG-4 Part 2.

In each network packet, two parts are in particular distinguished. A first part corresponds to data representing the start of a packet or a network header, for example an RTP (from the English "Real-time Transport Protocol") header. A second part corresponds to the useful data (or payload) of the network packet, comprising the data of the stream of coded data. This useful data contains at least part of a packet of coded data. If the size of the packet of coded data does not exceed the maximum acceptable size for the part corresponding to the useful data of a network packet, it is possible for a network packet to contain, in the part corresponding to the useful data, exactly one packet of coded data.

The network header comprises information concerning for example the number of the network packet indicating the index of the network packet in the order of sending, a marker indicating that a packet is the last one making up an image, etc.

In the present description, "encapsulating" consists of forming network packets 104 from a stream of coded data 102. Conversely, "de-encapsulating" consists of forming a series of data ready for decoding 153 from the network packets 151 (cf de-encapsulator 152, mentioned below).

The packets of coded data 102 are encapsulated in network packets 104, which are sent by a server 105 over a communication network. In this way, if a network packet is lost or corrupted, the other network packets containing useful data making up one and the same image or VOP remain decodable, since each packet of coded data is coded and encapsulated independently with respect to the other packets of coded data.

In the particular embodiment described here, the communication network is a packet switched communication network.

The protocol used for transporting data in this type of network is for example the RTP protocol. This type of protocol, well known per se to persons skilled in the art, is often used in the broadcasting of multimedia data.

As shown by the bottom part of FIG. 1, a client 150 recovers the network packets 151 from the communication network and identifies the network 104 belonging to the same image or VOP.

The client 150 then reads the network packets 151.

If necessary, the client 150 orders the network packets 151 when the order of reception has not been the same as that used for sending (for example in the case where the network packets 151 have followed different routes during their transmission in the communication network).

The packets of coded data are de-encapsulated by a de-encapsulator module 152 in order to form a series of data 153, here a bit stream, from the payload of the network packets 151. This series of data 153 should be identical to the data stream 102 encapsulated in network packets 104 and then sent by the server 105.

Nevertheless, it is possible for these two streams not to be identical, because of errors occurring during the transmission over the communication network.

In addition to the bit stream 153, the de-encapsulator 152 forms a series of additional data 154 that is routed to the decoder 155. The formation of this series of additional data 154 and its use by the decoder 155 will be described below.

A decoder 155 decodes the series of coded data 153 formed by the de-encapsulator 152 and thus produces decoded data 156.

Figure 2:
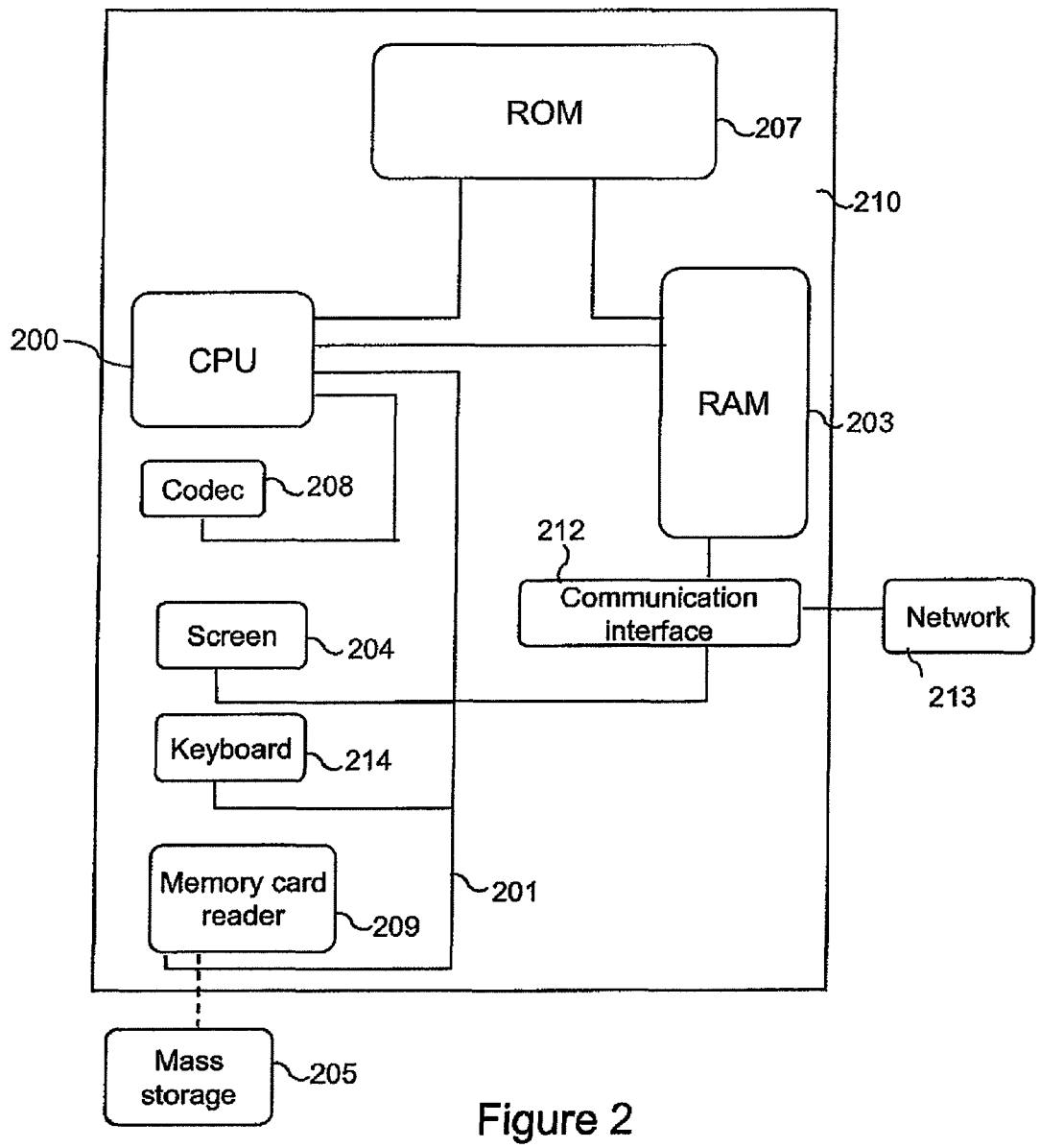
FIG. 2 depicts schematically a particular embodiment of an appliance able to implement the present invention.

FIG. 2 illustrates a device implementing the invention, in a particular embodiment.

This device is for example a portable multimedia reader 210.

The device 210 comprises a communication interface 212 connected to a network 213 able to receive digital data to be processed by the device in the context of the implementation of the invention. It also comprises a reader 209 for mass storage 205. This mass storage 205 can be a memory card or a USB peripheral for example. It can also contain data processed according to the invention as well as, in a first variant, the program or programs implementing the invention. According to a second variant, the program or programs enabling the device to implement the invention can be stored in read only memory 207 (referred to as ROM in the drawing). In a third variant, the program or programs can be received in order to be stored in an identical fashion to that described previously by means of the communication network 213.

This same device has a screen 204 for displaying the processed data or serving as an interface with the user, who can thus select other data to be processed, by means of the keyboard 214 or any other means (mouse, wheel or stylus for example).

The central unit 200 (referred to as CPU in the drawing) executes the instructions relating to the Implementation of the invention, instructions stored in the read only memory 207 or in the other storage elements. For example, the central unit performs the steps illustrated in FIG. 3 and described below. On powering up, the processing programs stored in a non-volatile memory, for example the ROM 207, are transferred into the random access memory RAM 203, which will then contain the executable code of the invention as well as registers for storing the variables necessary for implementing the invention.

In more general terms, an information storage means, able to be read by a computer or by a microprocessor, integrated or not in the device, possibly totally or partially removable, stores a program implementing the data processing method according to the invention.

The communication bus 201 affords communication between the various elements included in the device 210 or connected to it. The representation of the bus 201 is not limiting and in particular the central unit 200 is able to communicate instructions to any element of the device 210 directly or by means of another element of the device 210.

The device 210 also comprises a codec 208, for example in the form of a standard chip, used by the central unit 200 conventionally through the bus 201.

Figure 5:
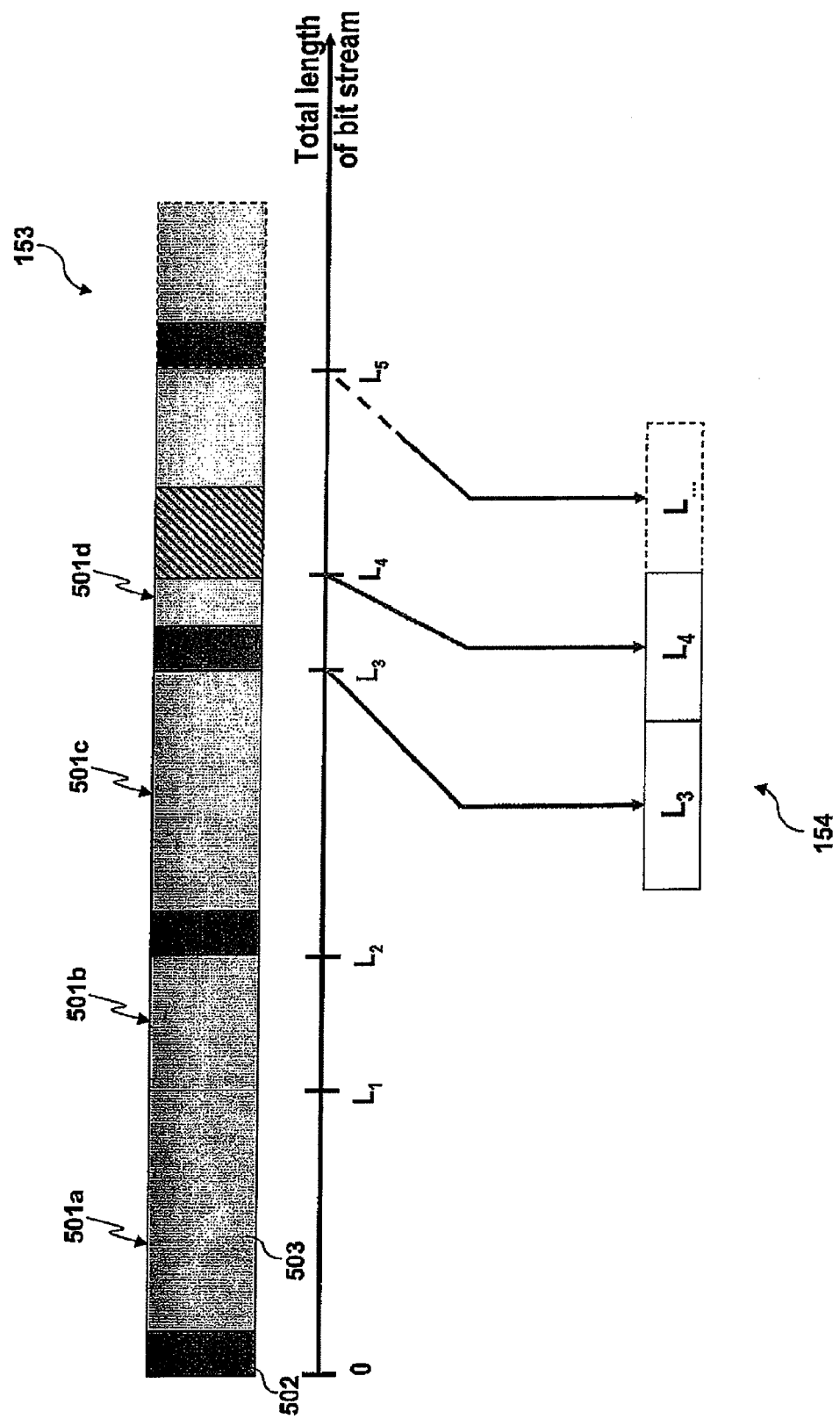
FIG. 5 illustrates portions of the coded data streams able to be processed according to the invention.

FIG. 5 depicts a portion of the series of coded data ready for decoding 153 formed by the de-encapsulator 152.

This portion of the series of coded data 153 comprises the payload of several network packets 151 corresponding to four coded data packets 501 belonging to an image or VOP.

Thus, in this in no way limiting example, the coded data packets are video data packets.

Each video data packet 501 comprises a video data packet header 502, called synchronization marker in the case of Part 2 of MPEG-4, followed by data 503 of the data stream which, in the non-limiting example described here, is a video stream.

A video data packet header represents a code signifying the start of the decoding of the video data packet independently of the other video data packets.

It comprises information referring to the data of the video data packet, for example the index number of the first coded macroblock belonging to an image.

It should be noted that a video data packet can be entirely contained in a network packet or distributed over several network packets.

This figure will be returned to once an embodiment of a method according to the invention has been described.

Figure 3:
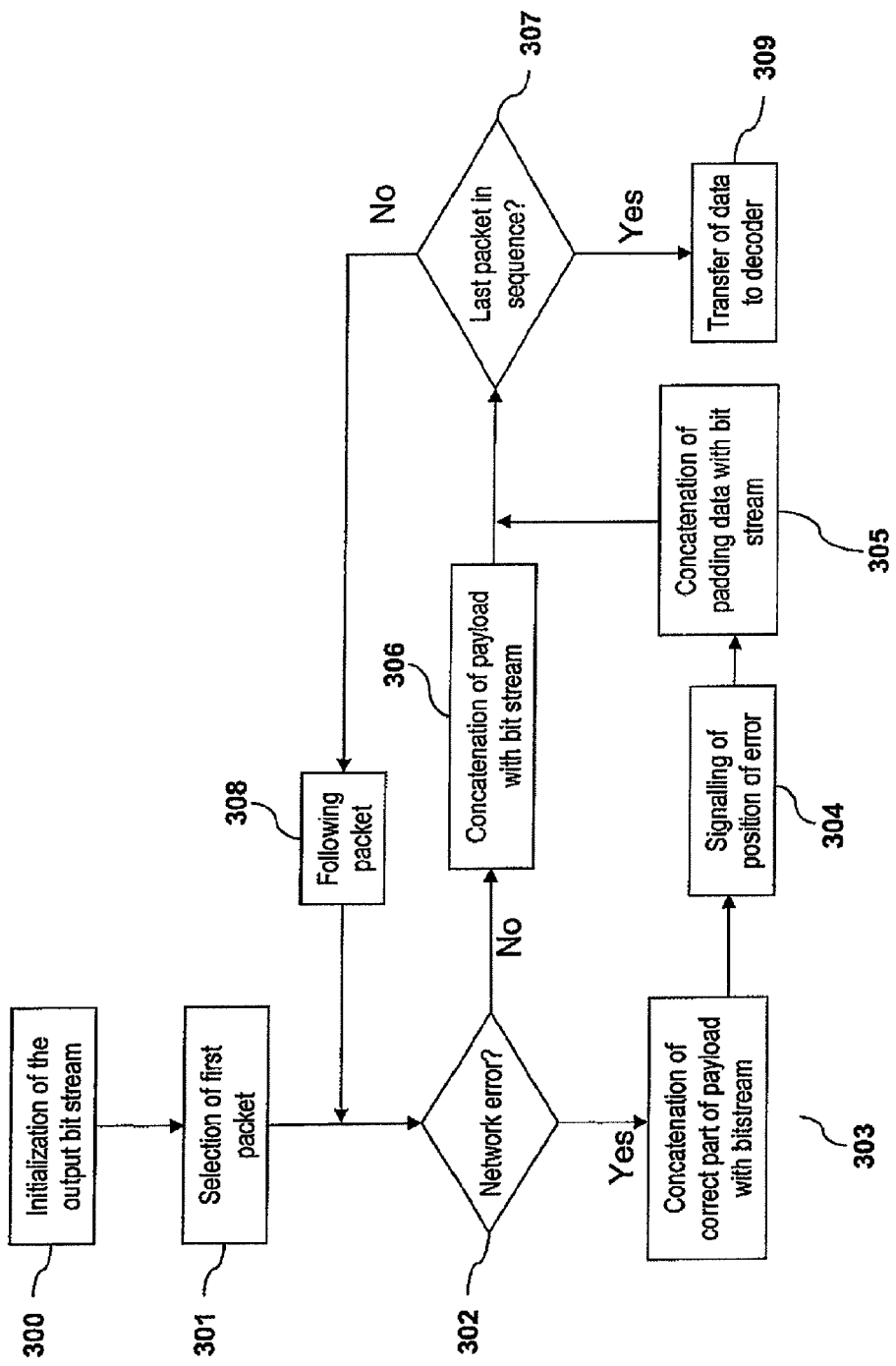
FIG. 3 is a flow diagram depicting a particular embodiment of part of a data processing method according to the invention.

FIG. 3 is a flow diagram illustrating part of a particular embodiment of the data processing method according to the invention.

When the de-encapsulator 152 receives the network packets 151 corresponding to an image, it initializes the series of coded data 153 in which the payload of these network packets will be inserted after de-encapsulation, during an initialization step 300.

The initialization step consists for example of the allocation of a buffer of sufficient size (for example greater than the sum of the sizes of the payloads of the network packets 151 corresponding to an image), where the bit stream will be placed. According to the architecture of the device implementing the invention, the memory used may for example be an area of a random access memory RAM, a buffer on the communication bus or a buffer within the decoder.

Here, the series of coded data 153 ready to be supplied at the input to the decoder 155 is a bit stream organized in bytes, that is to say the smallest unit of information corresponds to one byte.

During a first selection step 301, the de-encapsulator selects a first network packet 151.

A first verification step 302 is implemented in order to check whether there has been an error in the network during the transmission of the selected network packet.

As described above this error may be the loss of a previous network packet 151, as well as an error in the network packet 151, such as for example one or more erroneous bits or the loss of one or more bits. This error is detected for example by the application of a checksum (such as a CRC code (from the English "Cyclic Redundancy Check")). The network packet containing erroneous bits is marked as such.

The loss of a network packet 161 is detectable via the network header of the network packet 151. The network header may for example contain a sequence number representing the index of the network packet 151 at the time of sending. If a number is missing in the sequence, this indicates the loss of a network packet 151.

A network packet 151 containing an error may be marked as erroneous by layers of the network lower than the application layer (the operating layer of the de-encapsulator and decoder).

If there have been no errors during transmission of the previous network packet, the payload of the network packet 151 selected is concatenated with the coded bit stream 153 during a first concatenation step 306.

Next a second check step 307 is carried out, consisting of checking whether the network packet was the last network packet in the sequence received by the client 150.

If it is not a case of the last network packet 151, the de-encapsulator implements a second selection step 308 during which a following packet is selected.

After the implementation of this second selection step 308, the first check step 302 is returned to in order to check whether there has been an error in the network during the transmission of this new selected network packet 151.

When at the first check step 302 it is found that there has been an error, a second concatenation step is implemented.

This second concatenation step 303 consists of concatenating the correct part of the payload (that is to say the data situated in front of the missing or erroneous data) with the coded bit stream 153.

Next a signaling step 304 is implemented.

According to one embodiment, the signaling step 304 consists of noting information representing the position at which the error is situated in a series of additional data 154. This series of additional data 154 will be transmitted to the decoder at the same time as the series of data ready for decoding or coded bit stream 153.

This information representing the position comprises the position of the data situated in front of the missing or erroneous data in the part of the series of data ready for decoding 153.

In practice, the information representing the position comprises the length of the coded bit stream 153 that has been de-encapsulated up to the present time.

The length of the coded bit stream 153, that is to say the number of bits contained in the bit stream 153, is known to the de-encapsulator 152.

Various methods for noting the position of the erroneous or missing data can be employed.

For example, another method would consist of noting a length relating to the previous error, that is to say the difference between the position of the present error and the position of the previous error would be noted.

Naturally other methods for noting the positions of the erroneous or missing data could be employed.

In order to illustrate the signaling step 304, FIG. 5 is returned to.

FIG. 5 shows a portion of a coded bit stream 153 and a portion of a series of additional data 154, produced by the de-encapsulator 152.

The coded bit stream 153 comprises a first packet 501a, a second packet 501b and a third packet 501c that do not include any missing or erroneous data.

The coded bit stream 153 also comprises a fifth packet 501d comprising erroneous data.

The fourth packet is missing.

It should be noted that the second packet 501b does not comprise any packet header 502. This means that the encapsulator 103 has divided a packet of coded data into two different network packets 104 because of the fact that the size of the coded data exceeds the acceptable size for the part corresponding to the useful data of a network packet 104.

Thus the first packet 501a has the maximum acceptable size for the part corresponding to the useful data of a network packet 104.

The lengths of the first 501a, second 501b, third 501c and fifth 501d packets are shown on one axis and are called respectively L1, L2, L3 and L5. L4 represents the position as from which the erroneous data in the fifth packet 501d commenced.

When the de-encapsulator 152 forms this bit stream 153 and realizes that the fourth packet is missing, the length of the coded bit stream L3 (corresponding to the end of the third packet 501c) is noted in the series of additional data 154.

Likewise, when the fifth packet 501d is de-encapsulated, the length of the bit stream L4 corresponding to the position of the last data item of the bit stream before the position of the erroneous data is noted in the series of additional data 154.

FIG. 3 is returned to in order to describe the remainder of the processing method according to the invention.

In this embodiment, it has been seen that the signaling step 304 and a second concatenation step 303 are implemented.

This second concatenation step 303 consists, as described above, of extracting the part of the payload situated between the start of the payload of the network packet 151 and the position of the missing or erroneous data, and concatenating this payload with the coded bit stream 153.

Naturally, if the missing or erroneous data is situated at the start of the payload of the network packet 151, there exists no correct data situated in front of the missing of erroneous data to be concatenated with the bit stream 153.

Similarly, if the error corresponds to a missing network packet, no concatenation step 303 exists.

A third concatenation step 305 is then implemented. It consists of adding a series of padding data to the series of data ready for decoding 153.

This series of padding data is inserted from the start of the missing or erroneous data.

The reason why a series of padding data is inserted is that this data prevents the decoder from erroneously decoding valid data that follows erroneous data.

For example, a decoder that decodes a series of data corresponding to an entire macroblock before checking whether errors are present in the data of this macro-block does not recognize the presence of an error during the decoding of this macroblock.

In this case, after an error, the decoder continues to decode the data that follows it and consequently this valid data will not be properly decoded.

The presence of the padding data as from the position of the start of the erroneous data makes it possible to avoid erroneously decoding valid data and to validate it as if it were a case of correctly decoded data.

The length of the series of padding data is such that the series of data ready for decoding has a predetermined length. This predetermined length corresponds to the reading length of the decoder, in this example the length of a macroblock.

By way of in no way limiting example, in the case of MPEG-4 Part 2, the length of the series of additional data may be 700 bytes.

Thus, after the position of the erroneous data, and until the end of the macroblock, the data ready for decoding 153 corresponds to the series of padding data, and valid data in the series of data ready for decoding 153 is not decoded erroneously.

Next the first concatenation step 306 is implemented.

Next, the second check step 307 is implemented in order to determined whether the network packet 151 processed is the last network packet 151 in the sequence.

As described above, when the network packet 151 is not the last, the second selection step 308 is proceeded with.

When the network packet 151 is the last in the sequence, a transfer step 309 is performed, consisting of transmitting to the decoder 155 the series of data ready for decoding 153 as well as the series of additional data 154 formed by the de-encapsulator 152.

Figure 4:
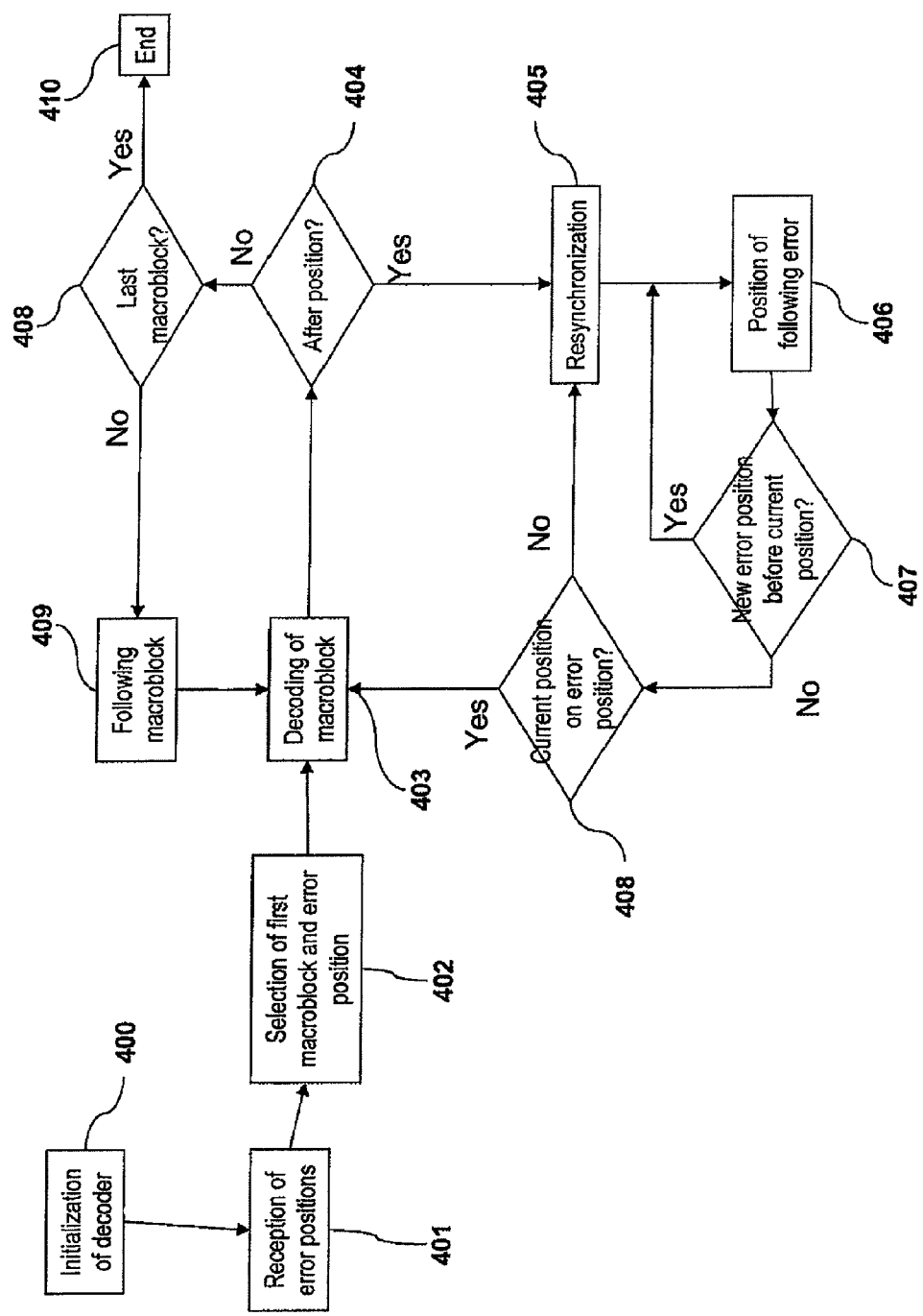
FIG. 4 is a flow diagram depicting a particular embodiment of a data processing method according to the invention.

FIG. 4 shows the part of the processing method according to the invention concerning the decoding of the series of data ready for decoding 153.

In this example, the decoder 155 selects and decodes macroblock by macroblock.

A macroblock is an area of the video image. The size of the macroblock is variable, for example according to the coding used. By way of in no way limiting example, the size of a macroblock may be 1, 50, 300 or 700 bytes.

The number of macroblocks contained in a packet of coded data is variable.

When the decoder 155 receives the coded bit stream 153 from the de-encapsulator corresponding to an image, it initializes the decoder 155 during an initialization step 400.

In a similar manner to that described above for the de-encapsulator, the decoder initialization step consists for example of the allocation of a sufficient buffer size (for example greater than the sum of the sizes of the payloads of the network packets 151 corresponding to an image), where the bit stream 153 will be placed. According to the architecture of the device implementing the invention, the memory used may for example be an area of a random access memory RAM, a buffer on the communication bus or a buffer within the decoder.

Here the series of coded data 153 ready to be supplied as an input to the decoder 155 is a bit stream organized in bytes, that is to say the smallest unit of information corresponds to a byte.

During a step of receiving the error positions 401, the decoder 155 receives the series of additional data 154 containing the error positions in the series of data ready for decoding 153.

In this example, the series of additional data 154 is added to the series of data ready for decoding 153, the two series of data 153, 154 thus forming a data stream received by the decoder 155.

Once the series of data ready for decoding 153 and the series of additional data 154 are ready, a selection step 402 is implemented.

In this embodiment, the selection step 402 consists of selecting the first macroblock to be decoded in the series of data ready for decoding or coded bit stream 153, and the first error position in the series of additional data 154.

Next the macroblock is decoded during a decoding step 403.

Once the macroblock has been decoded, the current position in the coded bit stream 153, that is to say the position of the last data item of the decoded macroblock, is compared with the error position during a comparison step 404.

If the error position is higher than the current position in the coded bit stream 153, this means that the macro-block that has just been decoded does not include any erroneous or missing data.

In this case, a third check step 408 is implemented in order to check whether the decoded macroblock is the last macroblock in the coded bit stream 153.

If the response is negative, during a second selection step 409, the following macroblock is selected and then decoded during the decoding step 403.

If the response is affirmative at the third check step 408, a step of finalization of the decoding 410 is carried out.

When at the comparison step 404 the error position is below the current position in the coded bit stream 153, this means that the decoded macroblock contains missing or erroneous data.

When the decoder realizes that the decoded macroblock contains errors, the decoder 155 that was desynchronized because of the reading of the erroneous or missing data proceeds with a resynchronization step 405 in order to seek synchronization.

In practice, during the resynchronization step 405, the decoder 155 is in resynchronization mode, that is to say the decoder 155 seeks a code on which it can synchronize itself and thus begin to read and decode data again.

Such a code is known by the term synchronization marker. A synchronization marker comprises data representing the start of a video data packet or of a series of video data packets and may be a video packet header or a start marker.

As described above, a video data packet header indicates the start of a video data packet and a start marker indicates the start of an image or VOP.

A synchronization marker has a variable length. In this in no way limiting example, the synchronization marker consists of 16 to 22 bits at 0 followed by one bit at 1.

Once the synchronization marker is found, the position of the following error is selected during a third selection step 406 and this error position is compared with the current position in the coded bit stream 153 (the position at which the synchronization marker has been found) during a fourth check step 407.

If the error position is lower than the current position in the coded bit stream 153, the selection step 406 is proceeded with once again in order to select the following error.

The step of selecting the following error 406 and the fourth check step 407 are implemented until the position of the following error is higher than the current position in the coded bit stream 153.

It is possible that, at the resynchronization step 405, the decoder may be resynchronized erroneously, meeting an error emulating a synchronization marker.

In order to prevent this, a fifth check step 408 is implemented.

This fifth check step 408 consists of comparing the current position in the coded bit stream 153 (or the position at which the decoder found the synchronization marker) with the current error position.

If these two positions are the same, this means that the decoder has resynchronized itself erroneously and it is necessary to return to the resynchronization step 405 in order once again to seek a synchronization marker.

If on the other hand these two positions are different, this means that the synchronization marker found by the decoder is indeed a synchronization marker.

The resynchronization step 405, the third selection step or step of selection of the following error 406, the fourth check step 407 and the fifth check step 408 are implemented until, at the fifth check step 408, the position of the following error is higher that the current position in the coded bit stream 153.

When this situation applies at the fifth check step 408, the decoding step 403 is carried out in order to decode the following macroblock.

In the embodiment described, the step of concatenating the padding data 305 enables the decoder 155 to read padding data instead of reading valid data to be decoded.

In another embodiment, in which the padding data concatenation step 305 is not implemented, the decoder is able to go back to the coded bit stream 153.

Thus the decoder, when it recognizes that an error exists in the decoded macroblock, returns to the last known correct position (that is to say the start of the decoded macroblock) and seeks a synchronization marker at the resynchronization step 405 from this correct position.

Thus, in the two cases, valid data of the coded bit stream 153 is not decoded erroneously and validated as if it were a case of correctly decoded data.

Naturally the method according the invention can be used for the processing of data streams of types other than multimedia.

In addition, the method also applies to data coded according to different standards, such as for example MPEG-2 or H.263, these two examples being in no way limiting.

What we claim is:

1. A method of processing a stream of coded data before decoding, comprising a step of detecting missing or erroneous data in said stream of coded data, a step of generating a series of data ready for decoding formed from said stream of coded data, and a series of additional data supplying information representing the position of the missing or erroneous data detected, and a step of concatenating, with said series of data ready for decoding, a series of padding data inserted from a start of the missing or erroneous data so as to obtain a series of data of predetermined length, wherein said information representing the position includes the position of a data item situated in front of the missing or erroneous data in the part of the series of data ready for decoding.

2. A method according to claim 1, further comprising:
a step of decoding part of said series of data ready for decoding having said predetermined length;
a step of comparing the position of the last decoded data of said part of said series of data ready for decoding, with a position of the erroneous or missing data in the series of additional data.

3. A method according to claim 2, wherein the data in the series of data ready for decoding, situated between the position of the last decoded data item and the position of the data representing the start of a packet of coded data is not decoded, when at the comparison step the position of the last decoded data item is higher than said position of the erroneous or missing data.

4. A method according to claim 2 or 3, wherein a second part of said series of data ready for decoding is decoded when, at the comparison step, the position of the last decoded data item is lower than the position of the erroneous or missing data.

5. A device for processing a stream of coded data before decoding, comprising means of detecting missing or erroneous data in said stream of coded data, means of generating a series of data ready for decoding formed from said stream of coded data, and a series of additional data supplying information representing the position of the missing or erroneous data detected, and means of concatenating, with said series of data ready for decoding, a series of padding data inserted from a start of the missing or erroneous data so as to obtain a series of data of predetermined length, wherein said information representing the position includes the position of a data item situated in front of the missing or erroneous data in the part of the series of data ready for decoding.

6. A device according to claim 5, further comprising:
   means of decoding part of said series of data ready for decoding having said predetermined length;
   means of comparing the position of the last decoded data item of said part of said series of data ready for decoding, at a position of the erroneous or missing data in the series of additional data.

7. A telecommunication system comprising a plurality of terminal devices connected through a telecommunication network, wherein it comprises at least one terminal device equipped with a device according to claim 5.

8. A non-transitory computer-readable information storage means retrievably storing instructions for controlling a computer to perform a method according to claim 1.

9. The non-transitory computer-readable information storage means according to claim 8, wherein the information storage means is partially or totally removable.

10. A method of processing a stream of compressed data, before decompression, comprising a step of detecting missing or erroneous data in said stream of compressed data, and a step of generating a series of data ready for decompression from said stream of coded data, and a series of additional data supplying information representing the position of the missing or erroneous data detected, and a step of concatenating, with said series of data ready for decompression, a series of padding data inserted from a start of the missing or erroneous data so as to obtain a series of data of predetermined length, wherein said information representing the position includes the position of a data item situated in front of the missing or erroneous data in the part of the series of data ready for decompression.

* * * * *